United States Patent [19]
Peters

[11] Patent Number: 5,387,154
[45] Date of Patent: Feb. 7, 1995

[54] TWO OUTLET CLEANING FAN
[75] Inventor: Loren W. Peters, Bettendorf, Iowa
[73] Assignee: Deere & Company, Moline, Ill.
[21] Appl. No.: 59,541
[22] Filed: May 10, 1993
[51] Int. Cl.$^6$ .............................................. A01F 12/48
[52] U.S. Cl. ...................................... 460/99; 460/100; 56/12.8
[58] Field of Search ................. 460/100, 99, 101, 111, 460/102; 56/12.8, 13.3

[56] References Cited

U.S. PATENT DOCUMENTS

| | | | |
|---|---|---|---|
| 990,804 | 4/1911 | Clymans et al. | 460/99 X |
| 2,612,742 | 10/1952 | Heth . | |
| 2,970,599 | 2/1961 | Jeantil . | |
| 3,392,832 | 7/1968 | Allen . | |
| 3,664,349 | 5/1972 | Quick | 460/99 |
| 3,800,804 | 4/1974 | Boone . | |
| 4,303,079 | 12/1981 | Claas et al. | 56/12.8 X |
| 4,307,732 | 12/1981 | De Busscher et al. . | |
| 4,422,462 | 12/1983 | Decoene | 460/100 X |
| 4,531,528 | 7/1985 | Peters et al. . | |
| 4,751,932 | 6/1988 | Busboom . | |
| 4,821,744 | 4/1989 | Turner et al. . | |

FOREIGN PATENT DOCUMENTS

| | | |
|---|---|---|
| 222254 | 5/1958 | Australia . |
| 965977 | 9/1950 | France . |
| 1482256 | 5/1969 | Germany . |
| 8221573 | 2/1986 | Germany . |
| 4028993A1 | 3/1990 | Germany . |
| 599002 | 3/1948 | United Kingdom . |

Primary Examiner—Terry Lee Melius

[57] ABSTRACT

A cleaning system of a combine is provided with a cleaning shoe having a step pan, a conditioning pan and a chaffer. A cleaning fan is provided with two outlets. The first outlet has two ducts. The first duct directs a primary air blast above the step pan through grain and chaff falling from the threshing system to the step pan. The second duct directs a secondary air blast through grain and chaff falling from the step pan and the separating system onto the conditioning pan. The second outlet directs a chaffer air blast to the chaffer.

3 Claims, 2 Drawing Sheets

TWO OUTLET CLEANING FAN

BACKGROUND OF THE INVENTION

1. Field of the Invention

The present invention is directed to a cleaning fan for a cleaning system of a combine having two outlets. The first outlet provides a primary and secondary air blast to grain and chaff falling to a step pan from the threshing system and to grain and chaff falling from the step shoe and separating system to a conditioning pan. The second outlet provides a chaffer air blast to the chaffer of the cleaning shoe.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

After separation and threshing the grain is directed to a cleaning system for separating chaff from the clean grain. Traditionally the cleaning systems of combines comprise a cleaning shoe having a chaffer and sieve. The chaffer and sieve are reciprocated fore and aft. A cleaning fan directs aspirated air through the chaffer and sieve blowing the lighter chaff out the rear of the combine. The heavier clean grain falls through the chaffer and sieve and is collected by a clean grain auger that directs it to a clean grain elevator. The elevator transports the clean grain to a clean grain tank on the combine.

Cleaning fans having two outlets providing two distinct air blasts are well known, see U.S. Pat. Nos. 4,531,528 and 4,821,744.

SUMMARY

It is an object of the present invention to provide a cleaning fan that better facilitates the separation of chaff from grain in a cleaning system of a combine.

It is a feature of the present invention the cleaning fan has a first outlet having two ducts. The first duct provides a primary air blast and the second duct provides a secondary air blast to fall grain and chaff.

Crop material from the threshing system is transported by axially extending augers to a step pan that is mounted to the cleaning shoe frame. Immediately below the step pan is a larger conditioning pan. Crop material from the separating system is directly deposited directly on the conditioning pan. Both the step pan and the conditioning pans have serrated bottoms which drive the crop material rearwardly as the pans are reciprocated fore and aft by the cleaning shoe.

In falling from the augers to the step pan the grain and chaff passes through a primary air blast. In falling from the step pan and separating system to the conditioning pan the grain and chaff passes through a secondary air blast. These air blasts remove some chaff from the crop material. The cleaning fan has two outlets. The first outlet has two ducts for the primary and secondary air identified above. The second outlet directs air to the chaffer and sieve. More specifically, this air passes upwardly through the chaffer and sieve blowing chaff out the rear of the combine.

DETAILED DESCRIPTION

Figure 1:
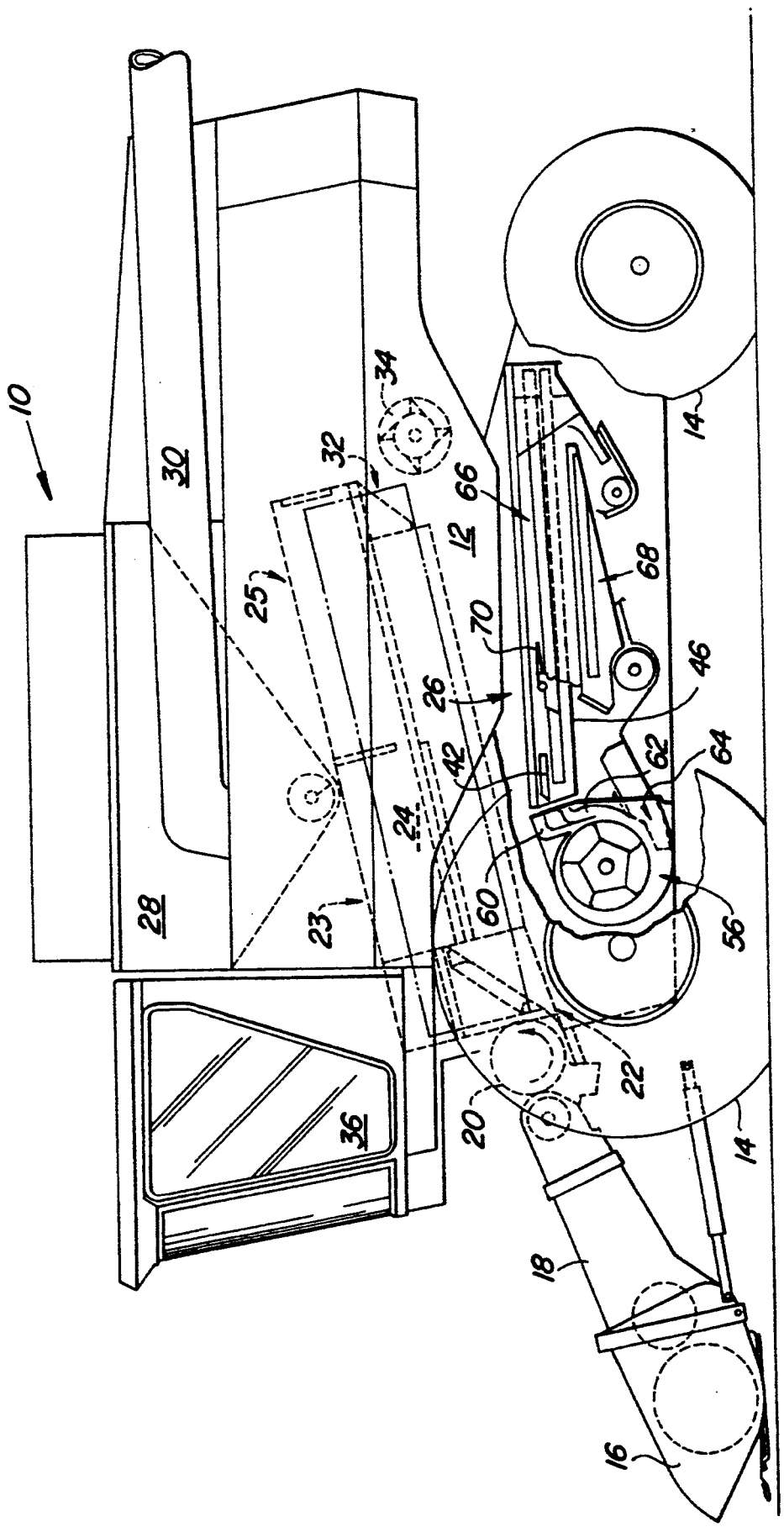
FIG. 1 is a semi-schematic side view of an axial flow agricultural combine.

FIG. 1 shows an agricultural combine 10 comprising a supporting structure 12 having ground engaging means 14 extending from the supporting structure. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit is provided with a threshing section or system 23 and a separating section or system 25. Grain and chaff fall through grates on the bottom of the unit 24 to cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater in turn propels the straw out the rear of the combine. The operation of the combine is controlled from operator's cab 36.

Although the present invention is disclosed in an axial flow combine it could also be used on a conventional combine having a transverse threshing cylinder and straw walkers, or any other combine having a cleaning shoe.

Grain and chaff from the threshing system falls on axially extending augers 40. The augers 40 transport the grain and chaff to a step pan 42 that is mounted to the cleaning shoe frame 44. The frame is reciprocated fore and aft by a conventional drive assembly, not shown. Immediately below the step pan 42 is a larger conditioning pan 46. As with the step pan 42, the conditioning pan 46 is mounted to the cleaning shoe frame 44. Crop material from the separating system is directly deposited on the conditioning pan 46. Both the step pan 42 and the conditioning pan 46 have serrated bottoms 48 and 50, respectively, which drive the crop material rearwardly as the pans are reciprocated fore and aft by the cleaning shoe frame 44.

Figure 2:
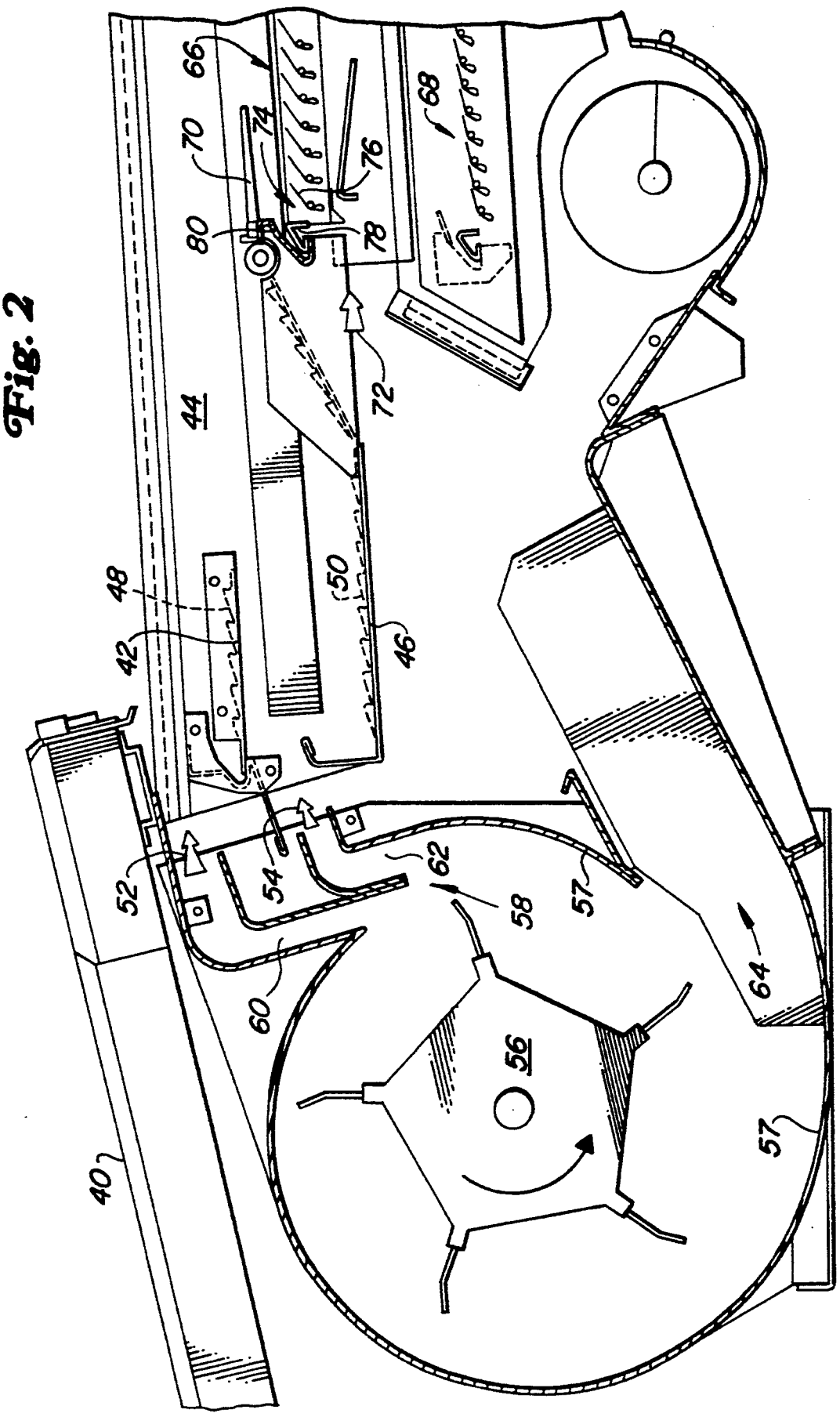
FIG. 2 is a side view of the forward portion of the cleaning system.

In falling from the augers 40 to the step pan 42 the grain and chaff falls through a primary air blast 52. In falling from the step pan and separating system to the conditioning pan the grain and chaff fall through a secondary air blast 54. As illustrated In FIG. 2 these air blasts are substantially horizontal with a slight upward component. These air blasts act to preclean the grain and chaff by removing some chaff from the crop material.

The cleaning fan 56 is provided with a housing 57 having two tangential outlets. The first outlet 58 has two ducts 60 and 62. The first duct 60 is used for directing the primary air blast 52 between the augers 40 and the step pan 42. The second duct 62 is used for directing the secondary air blast 54 between the step pan 42 and the conditioning pan 46.

The second outlet 64 directs air to the chaffer 66 and sieve 68. The second outlet is provided with a number of axially extending guides for guiding the air blast to the chaffer and sieve. Air is drawn into the fan axially and expelled tangentially through the two outlets.

The chaffer and sieve are mounted to the cleaning shoe frame 44 and are reciprocated fore and aft by the frame. The chaffer and sieve air passes upwardly through the chaffer 66 and sieve 68 blowing chaff out the rear of the combine.

A fingerbar 70 is mounted to the aft end of the conditioning pan 46 so that crop material leaving the conditioning pan passes through the fingerbar 70. The finger bar comprises a number of aft extending fingers that are mounted to a transversely extending bar that is bolted to the conditioning pan 46. The fingerbar 70 stratifies the crop material as it falls through the fingers. As the crop material falls through the fingers it encounters a chaffer air blast 72 from the forwardmost transverse opening 74 in the chaffer 66. The forwardmost opening 74 is formed by the first transverse louver 76 and the front transverse frame member 78 of the chaffer. The chaffer air blast through this opening 74 is approximately twice that of the chaffer air blast through the remaining chaffer transverse openings formed by adjacent transverse louvers. A gap 80 located between the conditioning pan and the chaffer is sealed to prevent the chaffer air blast from passing through this area.

The cleaning system of the present invention should not be limited by the above described embodiment, but should be limited solely by the claims that follow.

I claim:

1. An agricultural combine comprising:
   a supporting structure;
   ground engaging means extending from the supporting structure for transporting the supporting structure across a field;
   a threshing system for threshing grain from harvested crop material;
   a separating system for separating grain from threshed crop material;
   a cleaning system having a cleaning shoe that is provided with a chaffer, a conditioning pan and a step pan, grain and chaff is directed from the threshing system to the step pan, the grain and chaff falls from the threshing system onto the step pan, the step pan and the separating system direct grain and chaff to the conditioning pan, the grain and chaff falls from the step pan onto the conditioning pan, from the conditioning pan grain and chaff is directed to the chaffer, grain and chaff falls from the conditioning pan and the separating system onto the chaffer; and
   a cleaning fan having a first outlet and a second outlet, the first outlet has two ducts, the first duct directs a primary air blast from the cleaning fan through grain and chaff falling from the threshing system to the step pan, the second duct directs a secondary air blast from the cleaning fan through the grain and chaff falling from the step pan and separating system to the conditioning pan, the second outlet directs a chaffer air blast to the chaffer for grain and chaff received by the chaffer.

2. An agricultural combine as defined by claim 1 wherein the cleaning fan draws air in axially and expels the air tangentially through the outlets.

3. An agricultural combine as defined by claim 2 wherein the primary air blast and the secondary air blast are parallel.

* * * * *